Figure 1:
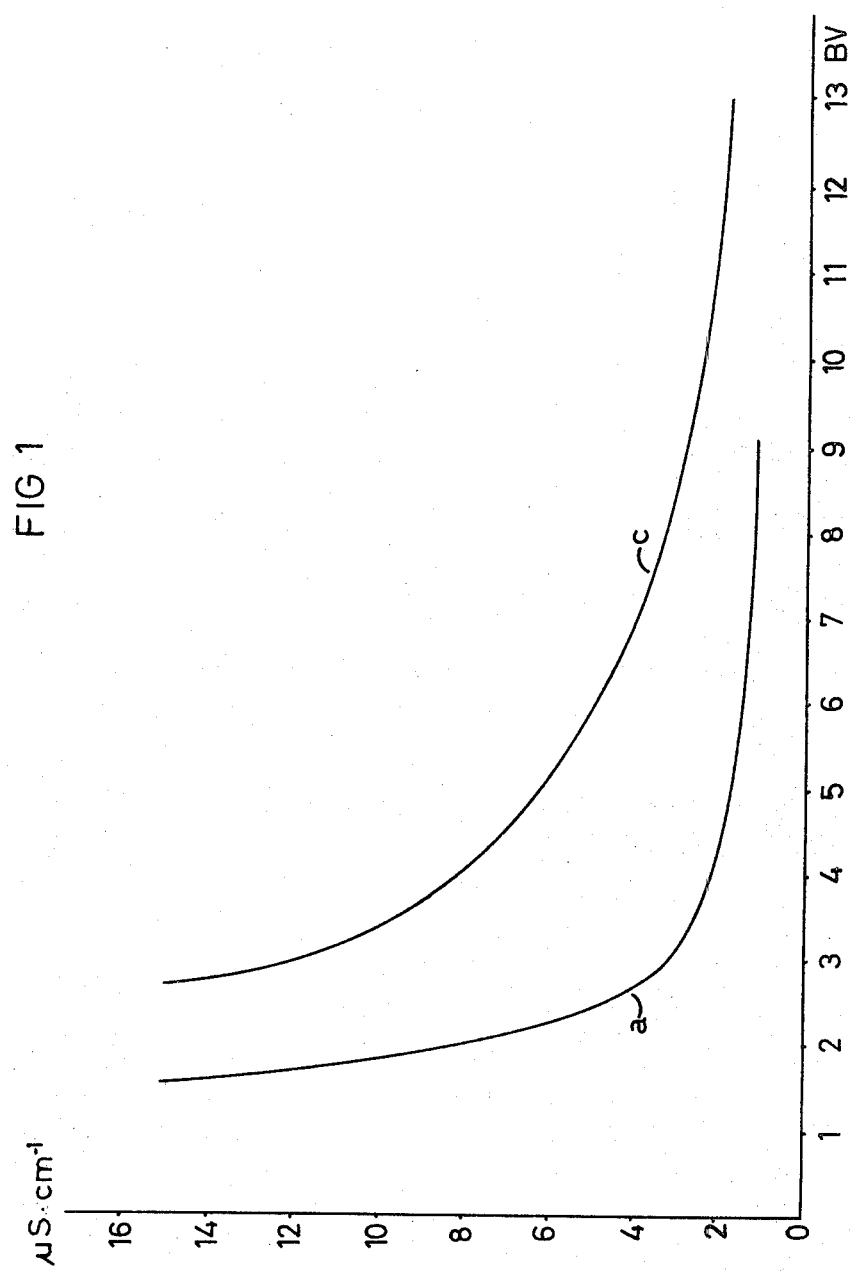

United States Patent [19]

Strüver et al.

[11] 4,319,015
[45] Mar. 9, 1982

[54] SYNTHETIC RESINS BASED ON CROSSLINKED COPOLYMERS OF MONOVINYL AND POLYVINYL COMPOUNDS

[75] Inventors: Werner Strüver; Harold Heller, both of Cologne; Peter M. Lange, Leverkusen, all of Fed. Rep. of Germany

[73] Assignee: Bayer Aktiengesellschaft, Leverkusen, Fed. Rep. of Germany

[21] Appl. No.: 81,967

[22] Filed: Oct. 4, 1979

[30] Foreign Application Priority Data

Oct. 24, 1978 [DE] Fed. Rep. of Germany ....... 2846187

[51] Int. Cl.³ .................. C08F 212/34; C08F 212/36; C08F 220/12; C08F 220/20
[52] U.S. Cl. ................................ 526/329.1; 428/521; 521/38; 526/293; 526/311; 526/323.2
[58] Field of Search ...................... 526/293, 311, 323.2, 526/329.1, 333, 336

[56] References Cited

U.S. PATENT DOCUMENTS

| | | | |
|---|---|---|---|
| 2,788,330 | 4/1957 | Gilwood et al. | 526/336 |
| 2,810,716 | 10/1957 | Markus | 526/329.1 |
| 2,910,456 | 10/1959 | de Gooreynd et al. | 526/336 |
| 3,218,299 | 11/1965 | Zanaboni et al. | 260/78.5 |
| 3,427,262 | 2/1969 | Corte et al. | 260/2.2 |
| 3,544,488 | 12/1970 | Corte et al. | 260/2.2 |
| 3,792,029 | 2/1974 | Roubinek et al. | 526/336 |

OTHER PUBLICATIONS

*Organic Chemistry of Synthetic High Polymers* by Robert W. Lenz, pp. 292 and 293, published by Interscience Publishers.

*Primary Examiner*—Harry Wong, Jr.
*Attorney, Agent, or Firm*—Sprung, Felfe, Horn, Lynch & Kramer

[57] ABSTRACT

New Synthetic resins useful as inert material for separating layers in ion exchanger mixed bed filters. The new synthetic resins are copolymers of
 (a) substituted styrenes and/or methacrylates,
 (b) methacrylates of polyhydric alcohols and/or aromatic polyvinyl compounds and
 (c) unsaturated hydrocarbons which have at least two allyl groupings in the molecule, and/or polyvinyl ethers of polyhydric alcohols, and optionally
 (d) styrene.

6 Claims, 3 Drawing Figures

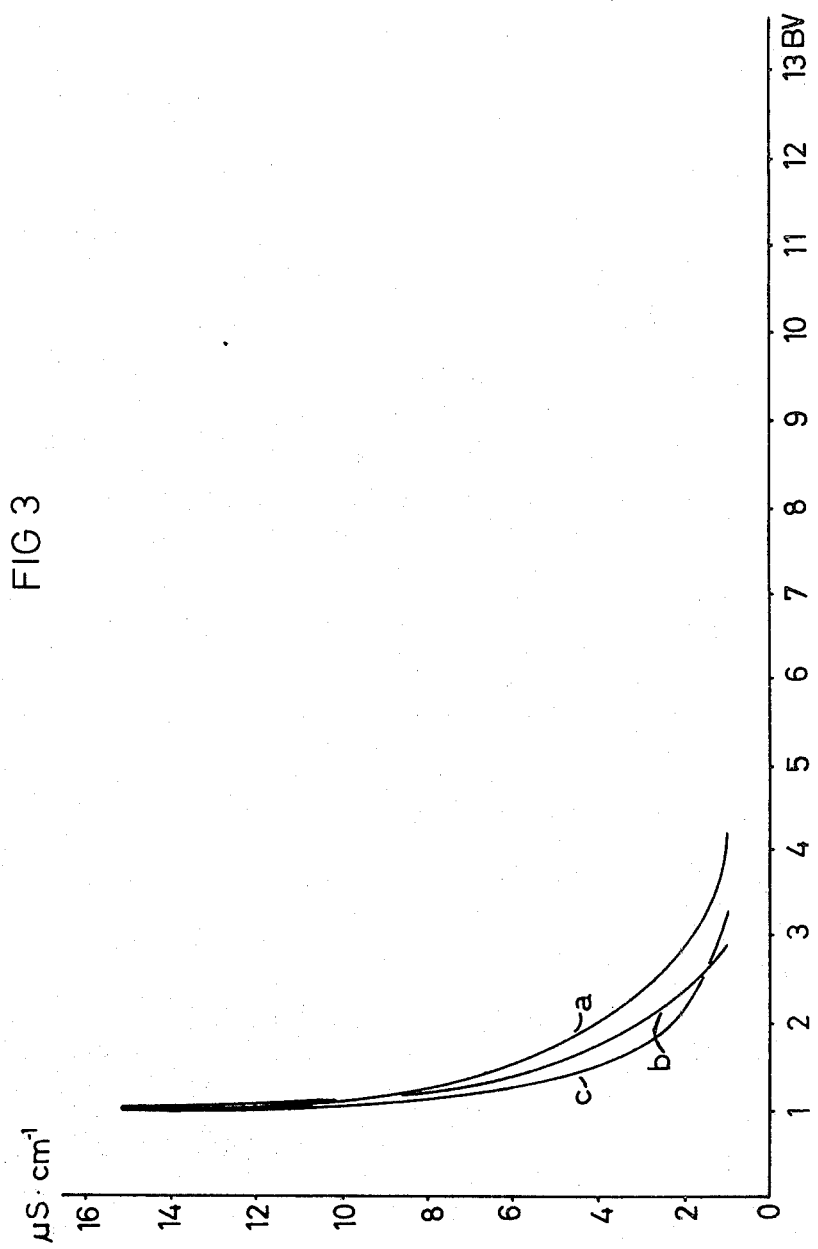

SYNTHETIC RESINS BASED ON CROSSLINKED COPOLYMERS OF MONOVINYL AND POLYVINYL COMPOUNDS

The invention relates to new synthetic resins based on crosslinked copolymers of monovinyl and polyvinyl compounds, a process for their preparation and the use of the synthetic resins as an inert material for separation layers in ion exchanger mixed bed filters.

The use of synthetic resins as an inert material for separation layers in ion exchanger mixed bed filters is known. Thus, for example according to U.S. Pat. No. 2,666,741, commercially available polystyrenes, which have a density and particle size such that in the separation of cation exchangers and anion exchangers they slip between the two types of ion exchangers, are used. In German Patent No. 971,771, bead (co)polymers of styrene, vinyl chloride, methacrylates, divinylbenzene and acrylonitrile are mentioned, generally, as separation materials. Acrylonitrile/butadiene/styrene resins, epoxide resins, polyamide resins and polystyrene resins are mentioned as separation materials in French Pat. No. 2,314,896.

However, these synthetic resins hitherto used as separation materials in ion exchanger mixed bed filters have serious disadvantages. Thus, for example, synthetic polystyrene resins have too low a density. As a result of having too low a density, the particles of the synthetic resin must have a size which is unsuitable for practical operation.

A serious disadvantage of all the synthetic resins hitherto used as separation materials is that, when used as indicated, they continuously release soluble constituents (above all non-crosslinked, soluble monomers and oligomers) into the water or the regeneration chemicals. This process, called "bleeding", considerably reduces the degree of purity of the water running out of the mixed bed filter. This "bleeding" manifests itself in the continuous chemical oxygen demand (COD) of the water running out of the mixed bed filter. This "bleeding" of the resins is particularly critical in the case of separation resins based on vinyl chloride and acrylonitrile, because of the high toxicity of these monomers. Some synthetic resins can indeed be freed from soluble, unreacted monomers by a special treatment, but removal of the soluble oligomers from the synthetic resins is not possible in practice, at least not to the required extent.

Another serious disadvantage of the known synthetic resins which are used as separation materials and are based on acrylates and acrylonitrile is their inadequate resistance towards hydrolysis. These resins hydrolyse under the conditions for regenerating the mixed bed filter under the infuence of heat, that is to say during the action of dilute acids or alkalis at temperatures of up to 80° C. The carboxyl groups formed during the hydrolysis cause the sodium to slip through and increase the times for washing out the mixed bed filter. Increased solution of the hydrophilised monomers and oligomers also results from the hydrolysis. The mixed bed filter finally becomes useless because of the instability of the separation resins towards hydrolysis.

New synthetic resins based on crosslinked copolymers of monovinyl and polyvinyl compounds have now been found, which do not have the disadvantages listed for the known synthetic resins, that is to say unfavourable density, release of soluble constituents and inadequate resistance to hydrolysis, and which are therefore excellently suitable as an inert material for separation layers in ion exchanger mixed bed filters. These new synthetic resins are obtained by copolymerisation of (a) styrenes, the benzene nucleus of which is substituted by $C_1$–$C_4$-alkyl groups, halogen atoms and/or nitro groups and/or the side chain of which is substituted by $C_1$–$C_4$-alkyl groups; and/or methacrylates, (b) methacrylates of polyhydric alcohols and/or aromatic polyvinyl compounds, (c) dienes and/or polyvinyl ethers of polyhydric alcohols, and optionally (d) styrene.

A decisive improvement in the properties of the resin is achieved by the conjoint use, according to the invention, of the 2 different types of crosslinking agents (components (b) and (c)). This is surprising, since resins with satisfactory properties are not obtained when either component (b) or component (c) is used as the sole crosslinking agent for component (a).

Examples which may be mentioned of styrenes, the benzene nucleus of which is substituted by $C_1$–$C_4$-alkyl groups, halogen atoms and/or nitro groups and/or the side chain of which is substituted by $C_1$–$C_4$-alkyl groups are: chlorostyrene, dichlorostyrene, vinyltoluene, chloro-vinyltoluene, nitrostyrene, nitrovinyltoluene, α-methylstyrene, α-methylvinyltoluene and α-methylchlorostyrene.

Methacrylates which may be mentioned in particular are the esters of methacrylic acid with alcohols containing 1 to 8 C atoms, such as methanol, ethanol, propanol, n-butanol, sec.-butanol, pentanol, iso-pentanol, n-hexanol and 2-ethylhexanol. Methyl methacrylate is preferably used.

Mixtures of substituted styrenes and methacrylates can also be employed. The proportion of styrenes relative to methacrylates in these mixtures depends on the density desired for the copolymer.

In some cases, for example in order to establish a certain density for the polymer, it has proved advantageous to also add up to 50% by weight, relative to the total weight of the monomers, of styrene to the monomers (a), (b) and (c).

Examples which may be mentioned of representatives of the methacrylates of polyhydric alcohols to be used as component (b) are: glycol dimethacrylate, diglycol dimethacrylate and glycerol trimethacrylate. Glycol dimethacrylate is preferably used.

Examples which may be mentioned of representatives of the aromatic polyvinyl compounds to be used as component (b) are: o-, m- and p-divinylbenzene, divinyltoluene, divinylnaphthalene and trivinylbenzene. Divinylbenzene is preferably used.

Examples which may be mentioned of representatives of dienes which are to be used as component (c) are: hexa-1,5-diene, 2-methyl-hexa-1,5-diene, 2,5-dimethyl-hexa-1,5-diene, hepta-1,6-diene, octa-1,7-diene and 1,2,4-trivinylcyclo-hexane. Hepta-1,6-diene and octa-1,7-diene are preferably used.

Examples which may be mentioned of representatives of the polyvinyl ethers of polyhydric alcohols to be used as component (c) are: glycol divinyl ether, diethylene glycol divinyl ether and glycerol trivinyl ether. Diethylene glycol divinyl ether is preferably used.

The amount of crosslinking agent to be used for the preparation of the synthetic resins according to the invention, that is to say the total weight of components (b) and (c), depends on the nature of component (a), the amount of styrene optionally added and the density which the synthetic resin should have. In general, it has proved advantageous for the total weight of components (b) and (c) to be 0.5 to 70% by weight, preferably 1 to 40% by weight, relative to the total weight of components (a), (b), (c) and, if appropriate, (d).

The proportions of the two components in the crosslinking agent combination of components (b) and (c) to be used according to the invention can vary within wide limits. In general, it has proved suitable for the weight of component (b) to be 2–95% by weight, preferably 10–80% by weight, relative to the total weight of components (b) and (c).

To prepare the synthetic resins according to the invention, components (a), (b), (c) and optionally (d) are copolymerised in the manner customary for copolymerisation reactions. The copolymerisation is preferably carried out as bead polymerisation in aqueous suspension. The polymerisation is initiated in a known manner by the customary free radical-forming agents.

The synthetic resins according to the invention can have either a gel structure or a macroporous structure. For the preparation of macroporous synthetic resins, the co-polymerisation is carried out in a known manner in the presence of organic liquids (pore-forming agents) (see, for example, Ullmanns Encyklopädie der technischen Chemie (Ullmanns Encyclopaedia of Industrial Chemistry), 4th edition, 1977, Volume 13, page 296).

EXAMPLE 1 (Comparison resin)

A solution of 900 g of methyl methacrylate, 100 g of technical grade divinylbenzene (composition: 62% of divinylbenzene, ~36% of ethylstyrenes, ~2% of naphthalene + diethylbenzenes) and 6 g of dibenzoyl peroxide is suspended in 1.5 l of 0.2% strength aqueous tylose solution, whilst stirring, and a bead polymerisation reaction is carried out at 60° C. for 5 hours, whilst stirring, and then at 90° C. for two hours, whilst stirring. After cooling, the beads are filtered off, washed with water and dried. Yield: 922 g (Resin B).

EXAMPLE 2

A solution of 927 g of methyl methacrylate, 33 g of technical grade divinylbenzene, 40 g of octa-1,7-diene and 6 g of dibenzoyl peroxide is suspended in 1.5 l to 0.2% strength aqueous tylose solution, whilst stirring, and a bead polymerisation reaction is carried out under the conditions described in Example 1. Yield: 984 g (Resin C).

EXAMPLE 3

A solution of 913 g of methyl methacrylate, 67 g of technical grade divinylbenzene, 20 g of octa-1,7-diene and 6 g of dibenzoyl peroxide is suspended in 1.5 l of 0.2% strength aqueous tylose solution, whilst stirring, and a bead polymerisation reaction is carried out under the conditions described in Example 1. Yield of bead polymer: 944 g.

EXAMPLE 4

A solution of 921 g of methyl methacrylate, 49 g of technical grade divinylbenzene, 30 g of 1,3,5-trivinylcyclohexane and 6 g of dibenzoyl peroxide is suspended in 1.5 l of 0.2% strength aqueous tylose solution, whilst stirring, and a bead polymerisation reaction is carried out under the conditions described in Example 1. Yield of bead polymer: 978 g.

EXAMPLE 5

A solution of 900 g of methyl methacrylate, 33 g of technical grade divinylbenzene, 60 g of octa-1,7-diene and 4 g of dibenzoyl peroxide is suspended in 2 l of 0.2% strength aqueous tylose solution, whilst stirring, and a bead polymerisation reaction is carried out under the conditions described in Example 1. Yield of bead polymer: 976 g.

EXAMPLE 6

A solution of 920 g of methyl methacrylate, 17 g of technical grade divinylbenzene, 30 g of hepta-1,6-diene and 10 g of dibenzoyl peroxide is suspended in 2 l of 1% strength polyvinyl alcohol solution, whilst stirring, and a bead polymerisation reaction is carried out under the conditions described in Example 1. Yield of bead polymer: 967 g.

EXAMPLE 7

A solution of 800 g of methyl methacrylate, 67 g of technical grade divinylbenzene, 13.3 g of diethylene glycol divinyl ether and 8 g of dibenzoyl peroxide is suspended in 1.5 l of 1% strength polyvinyl alcohol solution, whilst stirring, and a bead polymerisation reaction is carried out under the conditions described in Example 1. Yield of bead polymer: 856 g.

EXAMPLE 8

A solution of 927 g of methyl methacrylate, 33 g of technical grade divinylbenzene, 40 g of octa-1,7-diene and 8 g of diazoisobutyronitrile is suspended in 2 l of 0.2% strength aqueous tylose solution, whilst stirring, and a bead polymerisation reaction is carried out under the conditions described in Example 1. Yield of bead polymer: 940 g.

EXAMPLE 9

A solution of 500 g of p-chlorostyrene, 400 g of styrene, 33 g of technical grade divinylbenzene, 67 g of hepta-1,6-diene and 7 g of dibenzoyl peroxide is suspended in 1.2 l of 0.2% strength aqueous tylose solution, whilst stirring, and a bead polymerisation reaction is carried out under the conditions described in Example 1. Yield of bead polymer: 980 g.

EXAMPLE 10

A solution of 890 g of methyl methacrylate, 80 g of technical grade divinylbenzene, 30 g of octa-1,7-diene, 100 g of isododecane and 8 g of dibenzoyl peroxide is suspended in 1.5 l of 0.2% strength aqueous tylose solution, whilst stirring, and a bead polymerisation reaction is carried out under the conditions described in Example 1. Yield of bead polymer: 975 g.

EXAMPLE 11

A solution of 928 g of methyl methacrylate, 32 g of technical grade divinylbenzene, 40 g of diethylene glycol divinyl ether and 8 g of dibenzoyl peroxide is suspended in 1.5 l of 0.2% strength aqueous tylose solution, whilst stirring, and a bead polymerisation reaction is carried out under the conditions described in Example 1. Yield of bead polymer: 940 g.

EXAMPLE 12

A solution of 232 g of styrene, 696 g of methyl methacrylate 32 g of technical grade divinylbenzene, 40 g of octa-1,7-diene and 8 g of dibenzoyl peroxide is suspended in 1.8 l of 0.2% strength aqueous tylose solution, whilst stirring, and a bead polymerisation reaction is carried out under the conditions described in Example 1. Yield of bead polymer: 941 g.

EXAMPLE 13

A solution of 935 g of methyl methacrylate, 55 g of ethylene glycol dimethacrylate, 10 g of octa-1,7-diene and 6 g of dibenzoyl peroxide is suspended in 1.5 l of 0.2% strength aqueous tylose solution, whilst stirring, and a bead polymerisation reaction is carried out under the conditions described in Example 1. Yield of bead polymer: 983 g.

EXAMPLE 14

A solution of 993.8 g of methyl methacrylate, 3.2 g of technical grade divinylbenzene, 3 g of octa-1,7-diene and 8 g of dibenzoyl peroxide is suspended in 1.5 l of 0.2% strength aqueous tylose solution, whilst stirring, and a bead polymerisation reaction is carried out under the conditions described in Example 1. Yield of bead polymer: 866 g.

EXAMPLE 15

10 l of a strongly acid cation exchanger (H-form; particle size >0.7 mm), 10 l of a strongly basic anion exchanger, type 1 (OH form; particle size 0.3–0.8 mm) and 2.5 l of the bead polymer according to Example 2 (particle size 0.5–0.6 mm) are filled into an ion exchanger column provided with a nozzle plate at the bottom and a drainage system in the lower third. After backwashing the column with water at a rate of 6 m/h, complete separation of the three components is observed. All of the drainage system is then in the inert layer. Example to illustrate the different stabilities of the conventional synthetic resins used as separation layers and the synthetic resins according to the invention To characterise the stability of the various resins:
1. the different chemical oxygen demands (COD) of water treated with the various synthetic resins were determined; and
2. the weakly acidic exchange capacities of the resins before and after treatment with dilute sodium hydroxide solution and dilute sulphuric acid and the washing-out characteristics of the resins after charging with 4% strength sodium hydroxide solution were determined.

To determine the COD values, 150 ml of synthetic resin were stored with 300 ml of deionised water at 20° C. for 8 days. After separating off the water, its content of oxidisable substances was determined. The values obtained are summarised in Table 1.

TABLE 1

| COD value | |
|---|---|
| Resin A (conventional separation resin based on acrylonitrile/butadiene/stryrene) | 588 mg of O₂/l of resin |
| Resin B (according to Example 1) | 44 mg of O₂/l of resin |
| Resin C (according to Example 2) | <5 mg of O₂/l of resin (Detection limit: 5 mg of O₂/l of resin) |

To determine the weakly acidic exchange capacity, 150 ml of synthetic resin were heated to 80° C. with 300 ml of 4% strength sodium hydroxide solution or 300 ml of 10% strength sulphuric acid for 8 days. The resins were then washed with deionised water until neutral. The values obtained are summarised in Table 2.

TABLE 2

Weakly acidic exchanging groups

| | | | |
|---|---|---|---|
| Resin A | (a) | <0.5 | mmol of monovalent ions/l of resin |
| | (b) | 58 | mmols of monovalent ions/l of resin |
| | (c) | 12 | mmols of monovalent ions/l of resin |
| Resin B | (a) | <0.5 | mmol of monovalent ions/l of resin |
| | (b) | 36 | mmols of monovalent ions/l of resin |
| | (c) | 10 | mmols of monovalent ions/l of resin |
| Resin C | (a) | <0.5 | mmol of monovalent ions/l of resin |
| | (b) | <0.5 | mmol of monovalent ions/l of resin |
| | (c) | <0.5 | mmol of monovalent ions/l of resin |

(Detection limit: 0.5 mmol of monovalent ions/l of resin)

(a) designates the untreated separation resin;
(b) designates the separation resin treated with 4% strength sodium hydroxide solution at 80° C. for 8 days;
(c) designates the separation resin treated with 10% strength sulphuric acid at 80° C. for 8 days.

Figure 2:
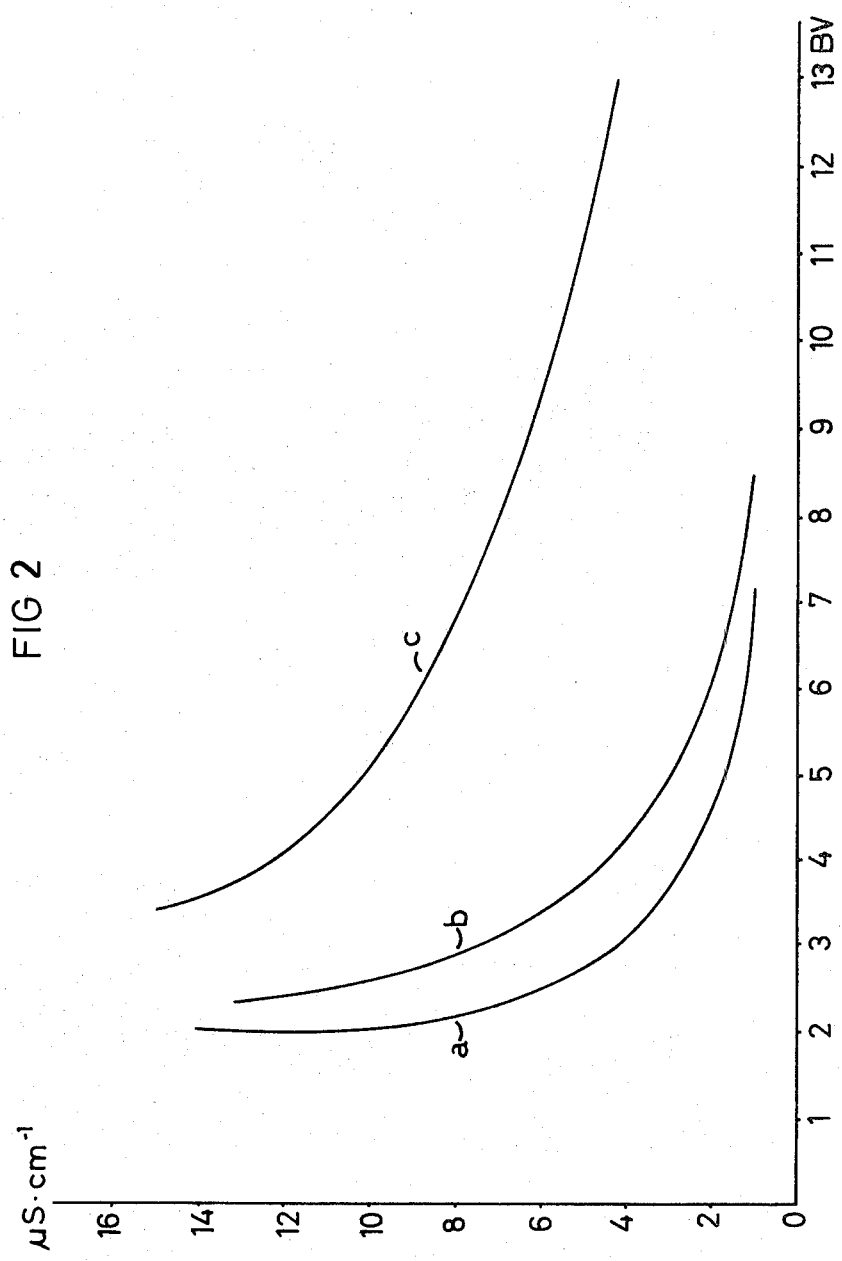

To determine the washing-out characteristics, 150 ml each of resin A, B and C, and this in the untreated form (a), in form (b), where the resins have been pretreated by warming to 80° C. with 4% strength sodium hydroxide solution for 8 days, and in form (c), where the resins have been pretreated by warming to 80° C. with 10% strength sulphuric acid for 8 days, were filled into columns and charged with 4% strength sodium hydroxide solution. The columns were then washed with deionised water and the conductivity of the eluates was determined. FIGS. 1, 2 and 3 show the conductivity values measured in the eluates as a function of the amount of eluate, that is to say the amount of water used for washing. The amount of eluate (wash water) is given in bed volumes (BV).

FIG. 1 shows the washing-out characteristics of resin A (A(a) and A(c) only; the washing-out characteristics of resin A(b) could not be recorded in FIG. 1 because the conductivity was still 59 μS.cm$^{-1}$ even after 15 bed volumes of wash water). FIG. 2 shows the washing-out characteristics of resin B (B(a), B(b) and B(c)) and FIG. 3 shows the washing-out characteristics of resin C (C(a), C(b) and C(c)).

What is claimed is:

1. A synthetic resin based on a crosslinked copolymer of monovinyl and polyvinyl compounds, obtained by copolymerizing
   (a) a styrene, the benzene nucleus of which is substituted by a $C_1$–$C_4$-alkyl group; halogen atom and/or nitro group and/or the side chain of which is substituted by a $C_1$–$C_4$-alkyl group; and/or a methacrylate of a monohydric alcohol containing 1 to 8 carbon atoms,
   (b) methacrylate of a polyhydric alcohol and/or an aromatic polyvinyl compound and
   (c) an unsaturated hydrocarbon selected from the group consisting of hexa-1,5-diene, 2-methyl-hexa-1,5-diene, 2,5-dimethyl-hexa-1,5-diene, hepta-1,6-diene, octa-1,7-diene and 1,2,4-trivinylcyclohexane, and/or a polyvinyl ether of a polyhydric alcohol the total weight of components (b) and (c) being 0.5 to 70% by weight of the total weight of components (a) plus (b) plus (c), the weight of component (b) being 2 to 95% by weight of the total weight of components (b) and (c).

2. The synthetic resin according to claim 1, wherein component (a) is a $C_1$–$C_8$-alkyl methacrylate, component (b) is glycol dimethacrylate or divinylbenzene and component (c) is hepta-1,6-diene, octa-1,7-diene or diethylene glycol divinyl ether.

3. The synthetic resin according to claim 1, wherein component (a) is methyl methacrylate, component (b) is divinylbenzene and component (c) is hepta-1,6-diene, octa-1,7-diene or diethylene glycol divinyl ether.

4. The synthetic resin according to claim 1, wherein the total weight of components (b) and (c) is 1 to 40% by weight, relative to the total weight of components (a), (b) and (c).

5. A synthetic resin according to claim 1, wherein there is copolymerized with said components (a), (b), and (c), styrene.

6. A synthetic resin according to claim 1, wherein component (a) is a $C_1$–$C_8$ alkyl methacrylate or a substituted styrene selected from the group consisting of chlorostyrene, dichlorostyrene, vinyltoluene, chlorovinyltoluene, nitrostyrene, nitrovinyltoluene, α-methylstyrene, α-methylvinyltoluene, and α-methylchlorostyrene, component (b) is a methacrylate of a polyhydric alcohol selected from the group consisting of glycoldimethacrylate, diglycoldimethacrylate, and glycerol trimethacrylate or an aromatic polyvinyl compound selected from the group consisting of o-m- and p-divinyl benzene, divinyl toluene, divinyl naphthalene, and trivinyl benzene and component (c) is an unsaturated hydrocarbon, selected from the group consisting of hexa-1,5-diene, 2-methyl-hexa-1,5-diene, 2,5-dimethyl-hexa-1,5-diene, hepta-1,6-diene, octa-1,7-diene and 1,2,4-trivinylcyclohexane or a polyvinyl ether of a polyhydric alcohol selected from the group consisting of glycol divinyl ether, diethylene glycol divinyl ether and glycerol trivinyl ether, the total weight of components (b) and (c) being 0.5 to 70% by weight, based upon the total weights of components (a), (b), and (c).

* * * * *